Aug. 6, 1929.          O. G. EDMOND          1,723,338
                       MORTISING MACHINE
                    Filed July 19, 1927      4 Sheets-Sheet 2

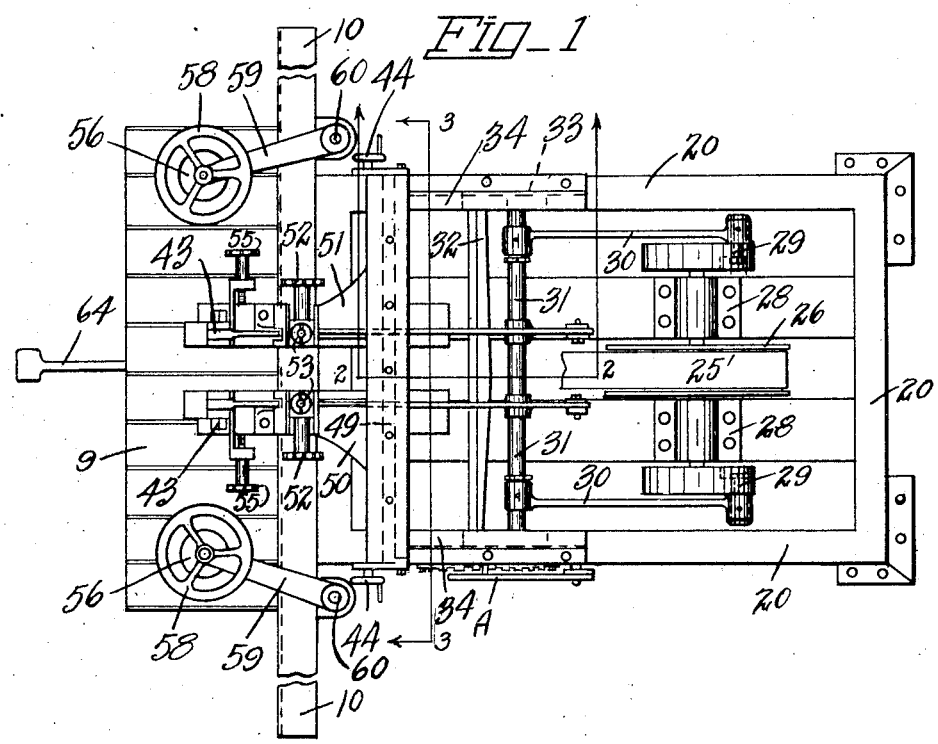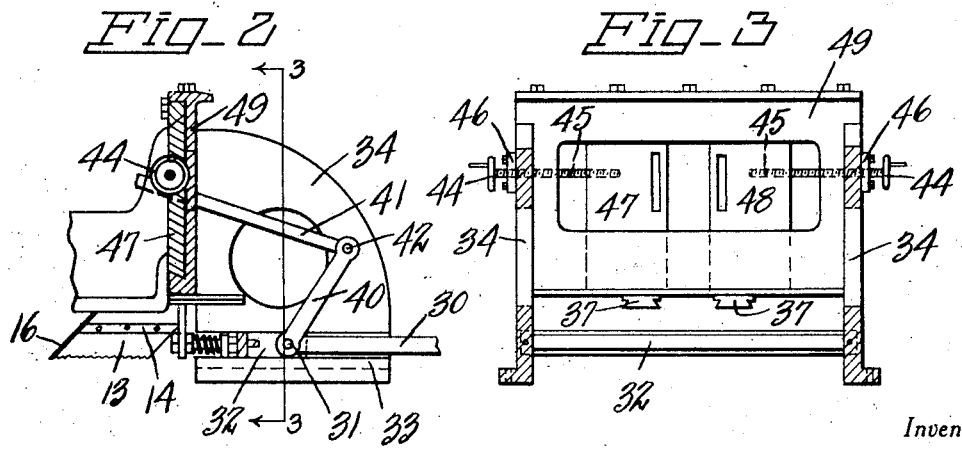

Inventor
Oscar G. Edmond
By Herbert E. Smith
Attorney

Aug. 6, 1929.  O. G. EDMOND  1,723,338
MORTISING MACHINE
Filed July 19, 1927  4 Sheets-Sheet 3
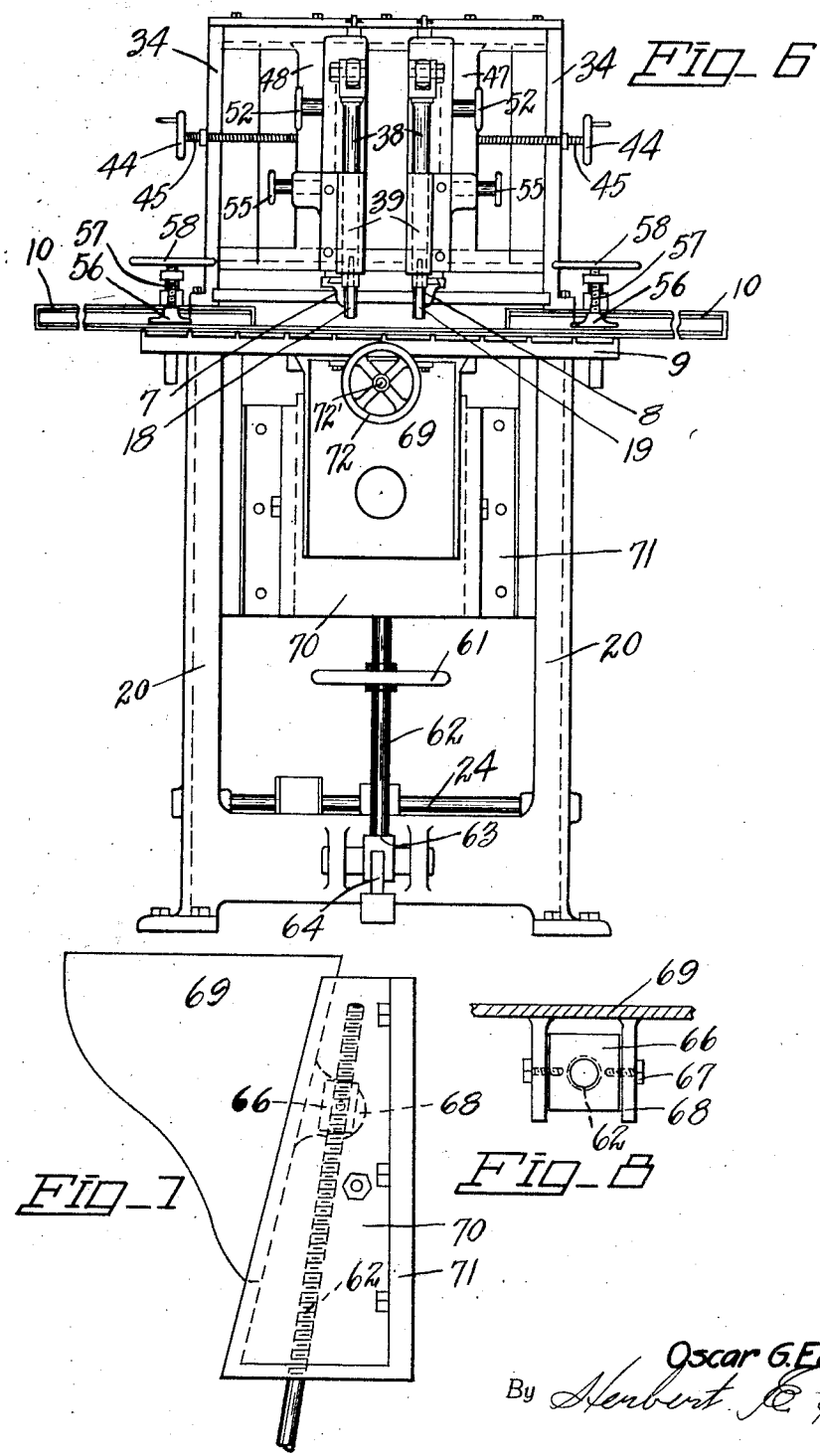
Inventor
Oscar G. Edmond
By Herbert R. Smith
Attorney

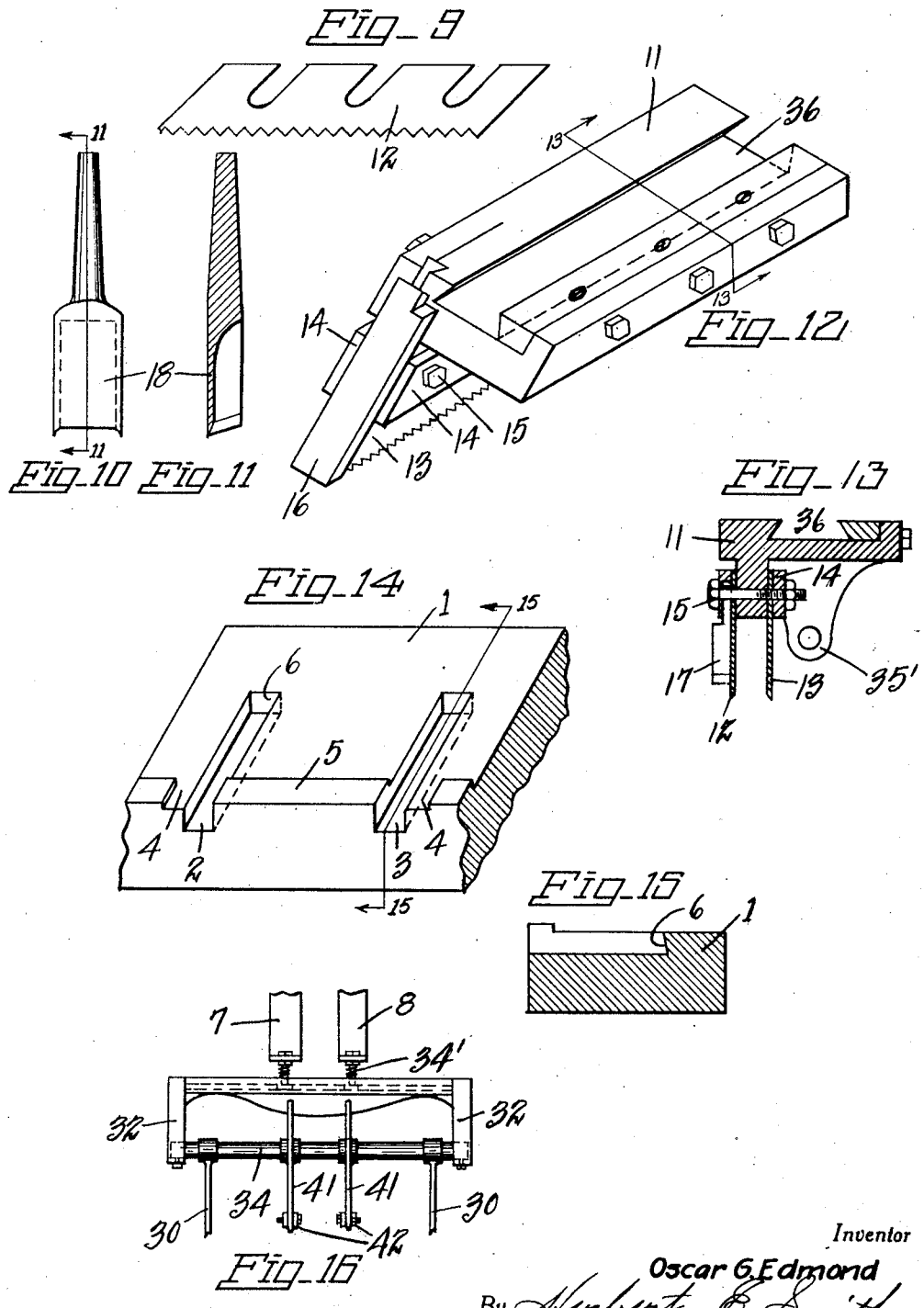

Patented Aug. 6, 1929.

1,723,338

UNITED STATES PATENT OFFICE.

OSCAR G. EDMOND, OF SPOKANE, WASHINGTON, ASSIGNOR OF ONE-HALF TO WHITE PINE SASH COMPANY, OF SPOKANE, WASHINGTON.

MORTISING MACHINE.

Application filed July 19, 1927. Serial No. 206,857.

In carrying out my invention, I utilize a pair of reciprocating cutting tools each of which includes a pair of spaced rigidly connected saws and a chisel that reciprocates with the saws, and in connection with these horizontally reciprocating cutting tools, I employ with each tool a chisel which reciprocates in a plane at an angle to the plane in which the cutting tool reciprocates.

The same operating means are employed for transmitting power to the cutting tools and to the chisels which operate independently thereof for cutting the blind end of the mortise, and a pair of mortises or dados are fashioned simultaneously by the action of the horizontally reciprocating cutting tools and the vertically reciprocating cutting tools.

The mortises are fashioned with an open end and a blind end, the latter being preferably undercut by the vertically reciprocating chisel, and the chisel carried by the cutting tool and reciprocating therewith is utilized to cut away the bead or ledge on the top face of the windowsill near its inner side.

The work is supported upon a vertically adjustable pedal controlled work table, and retained on the table in stationary position by usual clamp members during the mortising operation.

The work table is vertically adjusted to control the depth of the cut or mortise, and manual means are provided for this adjustment. The length of the mortise, which is cut transversely of the sill, is secured by adjusting the work table in the horizontal plane, and this adjustment is secured with the usual hand wheel, and the space between the two mortises in the sill is determined by adjusting the two cutting tools, together with their vertically operating chisels.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 4:
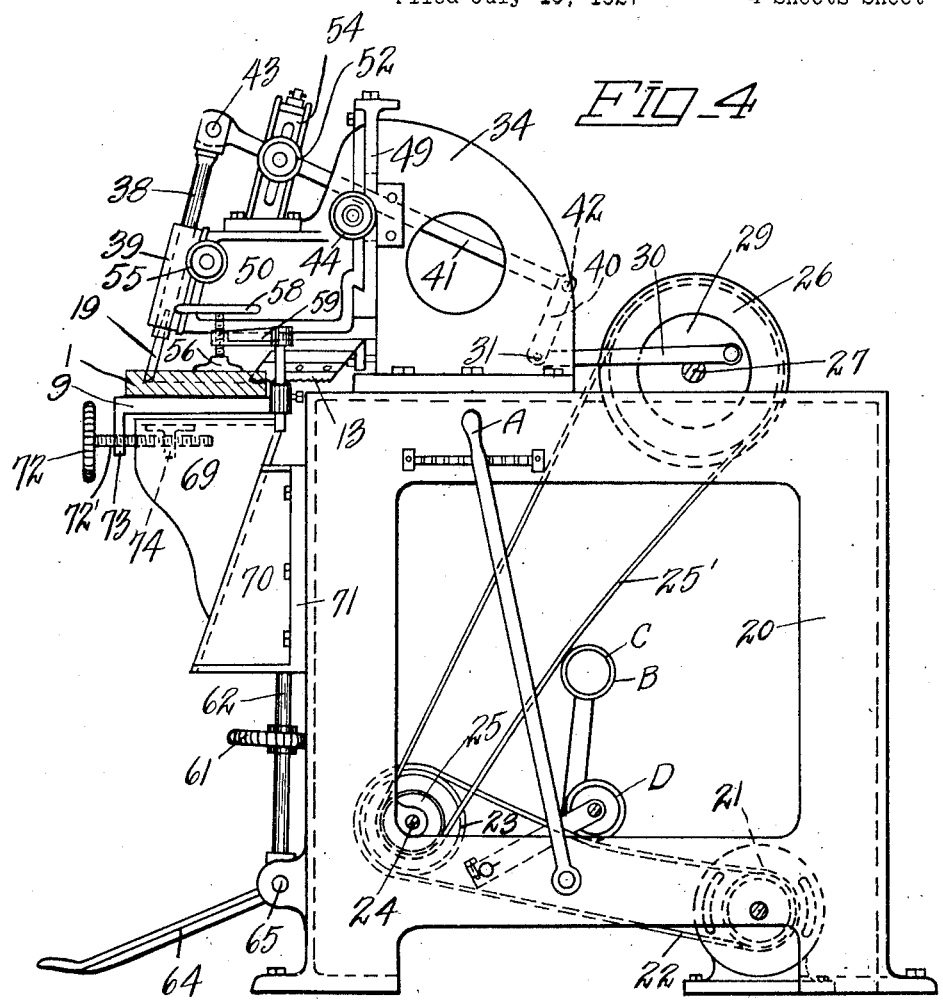
Figure 5:
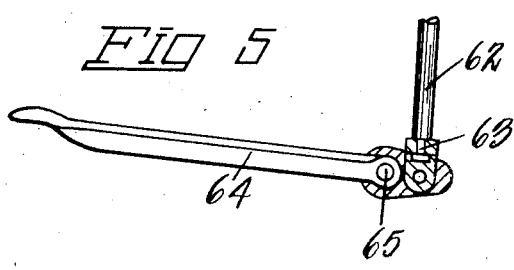

Figure 1 is a plan view of a machine embodying my invention; Fig. 2 is a sectional view at line 2—2 of Fig. 1, showing one of the reciprocating cutting tools; Fig. 3 is a transverse vertical sectional view at line 3—3 of Fig. 1; Fig. 4 is a view in side elevation of the machine showing a sill and the saw and chisel connections in operative position; Fig. 5 is a detail sectional view of the pedal joint for controlling the position of the work table; Fig. 6 is a front view of the machine; Fig. 7 is an enlarged detail side view of the adjustable work table and its supporting bracket; Fig. 8 is a sectional detail view of the table bracket showing its swivel nut or block therein; Fig. 9 is a perspective view of one of the saw blades; Fig. 10 is a face view of one of the chisels; Fig. 11 is a sectional view at line 11—11 of Fig. 10; Fig. 12 is a perspective view of one of the cutter heads; Fig. 13 is a sectional view at line 13—13 of Fig. 12; Fig. 14 is a perspective view showing a portion of a windowsill having a pair of spaced mortises cut therein by the machine; Fig. 15 is a sectional view at line 15—15 of Fig. 14; and Fig. 16 is a top plan view of the saw carriage or carriage for the reciprocating tool.

In order that the general utility of the invention may readily be understood, I have shown in Figs. 14 and 15 a portion of a windowsill 1 having spaced mortices 2 and 3 cut therein, and a dado 4 is shown as cut in the shoulder or ledge 5 located at the inner side of the windowsill, and in Fig. 15 the blind end 6 of the mortise is shown as undercut. The mortises are cut or fashioned with the reciprocating cutting tools, which are indicated as a whole as 7 and 8 in Fig. 6, and these cutting tools reciprocate across the top of a work table 9 upon which the windowsill 1 is retained against the work guides 10—10.

By reference to Fig. 12, it will be seen that the cutting tools each comprises a carrier as 11 to which are attached a pair of spaced saw blades 12 and 13 which are clamped by the bars 14 and bolts 15 at the underside of the cutter carrier or cutter head 11. It will be understood that the two saws 12 and 13 of each cutting tool will cut spaced kerfs in the top face of the sill, and a chisel 16 is carried at the front of the cutter head 11 for cutting out the wood between the kerfs as the depth of the kerf increases.

At the outer side of each of the cutter heads 11 is carried a chisel 17 which is designed for the purpose of cutting the dado 4 through the ledge 5 of the windowsill.

A pair of chisels 18 and 19 are utilized for undercutting the blind end 6 of the mortises, and these chisels while operating simultaneously with the same operating means that are employed for the reciprocating cutting tools, operate independently of the cutting tools. Thus as the horizontally movable cutting tools move to the left in Fig. 4 and transversely of the sill, the chisels 18 and 19 are elevated, and as the chisels descend on their working stroke, the cutting tools move to the right out of engagement from the sills.

A main frame is indicated at 20, and an electric motor or other motor is indicated at 21 in Fig. 4. A drive belt 22 extends from the motor to a pulley 23 on the countershaft 24, and a pulley 25 on the countershaft transmits power through the belt 25' to a pulley 26 on a crank shaft 27 which is journaled in bearings 28 at the top of the main frame. The starting and stopping of the operating mechanism is controlled by a hand level A which operates a belt tightener B, and the pulleys or rollers C and D by their engagement with the belts effect the operation of the crank shaft.

A pair of eccentrics or disks 29 are carried on the crank shaft and from these disks the pitmen 30 extend to a shaft 31 which is carried in a cross head 32 that reciprocates horizontally in the guides 33 of the top frame 34 which is supported on the top of the main frame 20.

The reciprocating cutting tools 7 and 8 are secured to the cross head 32 as best seen in Fig. 16, by bolts 34', these bolts being secured to the perforated lugs 35' on the carriers 11 as indicated in Fig. 13. The cutter head 11 of the cutting tools are fashioned with dovetailed grooves 36 on their upper faces, and these grooved faces coact with the guides 37 on the top frame 34 as seen in Fig. 3.

The vertically reciprocating chisels 18 and 19 that form the undercut blind end of the mortises are fixed in their holders 38, and these holders slide or reciprocate in the sleeves 39. The chisels on their working stroke alternate with the working stroke of the cutting tools, and they are actuated from the crank shaft 27 through movement of the cross head by rock arms 40, links 41 which are pivoted at 42, and pivoted to the chisels 18 and 19 at 43.

The cutting tools are relatively adjustable longitudinally of the work for the purpose of varying the distance between the mortises, and for this purpose I utilize a pair of hand wheels 44 each having a screw bar 45 in bearings 46 on the top frame 34.

These screw bars 45 engage with laterally slidable head plates 47 and 48 that are supported in the front plate 49 of the frame 34. The plate 49 forms part of the two tool heads 50 and 51, and these heads are adjustable longitudinally of the sill. The rock arms 40 on the rock shaft 31 are also adjustable longitudinally of the shaft to permit the adjustment of the cutting tools.

The stroke of the chisels 18 and 19 may be varied by varying the leverage of the links 41 of the chisels, and the fulcrums of these links 41 may be elevated or lowered and secured in clamped position through the use of hand wheels 52 and clamp heads 53 on the slotted brackets 54, said brackets being supported upon the heads 50 and 51.

The chisel guides 39 are also adjustable and clamped in adjusted position by means of hand wheels 55.

The work is clamped on the table during the mortising operation by means of a pair of clamp heads 56, screw bars 57, hand wheels 58 and arms 59 which are pivoted at 60 on the work table. These clamp devices are located at opposite ends of the work table and may be swung outwardly or inwardly to position for use in usual manner.

The work table is vertically adjustable to control the depth of the cut or mortise by means of a hand wheel 61 and screw bar 62, the lower end of the screw bar being pivoted at 63 in the short arm of a pedal lever 64 which is pivoted at 65 in the front of the main frame. It will be apparent that by depressing the pedal, the table with the work thereon may be elevated or fed to proper position, and while in this position is held by the heads 56 at opposite ends of the table. After the mortises have been cut, the pedal is released and the table with the work supported thereon fall away from the tools, after which the mortised sill is removed and a succeeding sill placed in position.

The screw bar 62 is employed for adjusting the depth of the mortise, and it is threaded in a nut 66 which is swivelled on trunnions 67 in lugs 68 of a slide bracket 69 used at the underside of the table. The slide bracket 69 slides in a guide frame 70 which frame by means of its flanges 71 is bolted to the main frame 20. It will be apparent that by turning the hand wheel 61 the table may be elevated or lowered for the adjustment of the cut of the tools.

The table and its work are also horizontally adjustable for determining the length of the mortise, and for this purpose a hand wheel 72 is employed, said hand wheel having a screw bar 72' that is journaled in the flange 73 of the table, and threaded in a perforated lug or nut 74 fixed to the bracket 69 as best seen in Fig. 4. By turning the hand wheel 72 it will be apparent that the table may be slid to the right or to the left in Fig. 4 for varying the relation of the supported and retained sill to the strokes of the reciprocating cutting tools 7 and 8.

Having thus fully described my invention, what I claim as new and desire to secure by Letters Patent is—

1. The combination in a mortising machine with a reciprocating cross head and operating means therefor, of a pair of cutter heads connected to the cross head, a pair of spaced saws carried by said cutter heads, and a chisel carried by each cutter head in advance of its saws.

2. In a mortising machine the combination with a reciprocating cutter head, of a pair of spaced saws carried thereby, a chisel carried by the cutter head and adapted to cut the work between the saws, and a second chisel carried at the side of the cutter head.

In testimony whereof I affix my signature.

OSCAR G. EDMOND.